United States Patent
Vieregge et al.

(10) Patent No.: US 6,915,463 B2
(45) Date of Patent: Jul. 5, 2005

(54) SYSTEM AND METHOD FOR PERFORMING PRE-EMPTIVE PROTECTION SWITCHING

(76) Inventors: Richard Charles Vieregge, 114 Hobart Crescent, Nepean, Ontario (CA), K2H 5S6; Hans Frederick Johnsen, 410 Pickford Drive, Kanata, Ontario (CA), K2L 3R5; Walter Joseph Carpini, 20 Bert Argue Drive, Stittsville, Ontario (CA), K2S 1X9; Victoria Donnelly, 143 Castle Glen Crescent, Kanata, Ontario (CA), K2L 4G9

( * ) Notice: Subject to any disclaimer, the term of this patent is extended or adjusted under 35 U.S.C. 154(b) by 600 days.

(21) Appl. No.: 10/025,868

(22) Filed: Dec. 26, 2001

(65) Prior Publication Data

US 2003/0120983 A1 Jun. 26, 2003

(51) Int. Cl.[7] .......................... H04B 17/00; H04B 1/74
(52) U.S. Cl. .................... 714/704; 398/3; 398/5; 398/27; 714/708; 714/712
(58) Field of Search ................ 714/704, 708, 714/712; 398/3, 5, 27; H04B 17/00, 1/74

(56) References Cited

U.S. PATENT DOCUMENTS

| | | | | |
|---|---|---|---|---|
| 4,677,619 A | * | 6/1987 | Kawai | 714/706 |
| 5,587,996 A | * | 12/1996 | Mizuno | 398/5 |
| 5,627,837 A | * | 5/1997 | Gillett | 714/708 |
| 5,764,651 A | | 6/1998 | Bullock et al. | 371/5.5 |
| 6,141,532 A | | 10/2000 | Mizuike et al. | 455/8 |
| 6,295,614 B1 | * | 9/2001 | Peters et al. | 714/704 |
| 6,570,682 B2 | * | 5/2003 | Robinson et al. | 398/20 |

FOREIGN PATENT DOCUMENTS

| | | | | |
|---|---|---|---|---|
| EP | 889601 A2 | * | 1/1999 | H04B/01/74 |
| EP | 1083711 | | 8/2000 | H04L/12/56 |

OTHER PUBLICATIONS

"Viterbi Decoding Algorithm for Convolutional Codes with Repeat Request" by Hirosuke Yamamoto et al.; IEEE Transactions on Information Theory, vol. IT–26 No. 26. Sep. 1980 pp 540–547.*

"Monitoring Voice over IP Service Quality" by Dr. Alan Clark; Telchemy Inc., Suwanee, GA copyright 2001 URL: http://www.telchemy.com/conferences/2001/supernet.pdf.*

"4–month Astrological Forecast" by Madam Lulu; Apr. 24, 1997; URL: https://mmm707.vwh1.net/madam4/psy–ast5a.htm.*

"Anticipations and Hopes for the Immediate Future" by Alfred Russel Wallace; The Clarion (London) Jan. 1, 1904 p. 1 URL: http://www.wku.edu/~smithch/wallace/S610.htm.*

* cited by examiner

Primary Examiner—R. Stephen Dildine
(74) Attorney, Agent, or Firm—Victoria Donnelly

(57) ABSTRACT

Methods and network nodes are provided which are adapted to perform protection switching on the basis of raw signal quality information, such as raw BER information, in a manner which instigates the protection switching before an actual failure has occurred. In some embodiments, these methods leverage forward error correction and uncorrected BER to effect traffic redirection before faults are observed at layer 2 and above. This is as opposed to the method of switching layer 2 traffic in response to bitstream characteristics observed at that layer.

20 Claims, 4 Drawing Sheets

SYSTEM AND METHOD FOR PERFORMING PRE-EMPTIVE PROTECTION SWITCHING

FIELD OF THE INVENTION

The invention relates to communications network protection switching.

BACKGROUND OF THE INVENTION

In the event there is a network failure which causes a service being provided on a first path through the network to go down, it is common to invoke a protection switching mechanism whereby the service is switched over to another path.

Various approaches exist, such as 1+1 protection, where data is sent over both a main path and a second path at all times. This provides low data loss, but requires approximately twice the network resources for each service.

Another approach is 1:1 protection, where a second path is configured, and in which low priority traffic may use the second path until it is required, at which point the low priority traffic is pre-empted. This provides low data loss. Its use of network resources depends upon the availability of low priority traffic. Also the pre-emption of the low priority traffic is an undesired aspect.

Yet another approach is to employ routing table updates, where a protocol like OSPF is used to update routing tables upon a failure. This provides good network utilization, but there is a large data loss as the routing tables across the network are updated.

Another solution involves reconnection, where a new path is calculated and set up after the failure occurs. Again, this provides good network utilization, but there is substantial data loss as the new path is calculated and set up.

It is common to perform BER measurement in SONET networks, see for example U.S. Pat. No. 5,764,651 which teaches the generation of signal degrade conditions when the BER becomes a certain value, and signal fail if the BER is even worse than that. However, the detection of these conditions has only been used to trigger the above discussed protection mechanisms. The signal degrade conditions are sent to a network management platform where a warning alarm might be raised.

In U.S. Pat. No. 6,141,532, a system of deciding whether to connect a call through a primary or backup transmission line is disclosed. The reference teaches analyzing the quality of a transmission line by looking at C/N and BER and sending this to a forecaster. The forecaster decides the likelihood that a failure is in the process of occurring within some predetermined time, such as the "mean call holding time". If a failure is significantly likely, the call is connected through a backup transmission line, and otherwise, the call is connected through the primary transmission line. The reference does not deal with performing protection switching after a call is connected and is ongoing.

It is noted that it is common to employ FEC (forward error correction) to allow a certain number of errors to be corrected. Because of this, the raw BER can increase to a certain value with no impact on the error rate in the corrected bit stream, i.e. the corrected BER. However, once the BER reaches this certain value, sometimes referred to as the "coding correction cliff", incorrect decoding results in a large increase in the corrected BER. The correction capabilities of FEC codes decrease by several orders of magnitude once the raw BER reaches this value.

SUMMARY OF THE INVENTION

Methods and network nodes are provided which are adapted to perform protection switching on the basis of raw signal quality information, such as raw BER information, in a manner which instigates the protection switching before an actual failure has occurred.

In some embodiments, these methods leverage forward error correction and uncorrected BER to effect traffic redirection before faults are observed at layer 2 and above. This is as opposed to the method of switching layer 2 traffic in response to bitstream characteristics observed at that layer.

According to a first broad aspect, the invention provides a method of performing protection switching in a communications network. The method involves a) on an ongoing basis, monitoring a raw quality measure in respect of a first path through the communications network; b) on an ongoing basis, deciding on the basis of the quality measure whether a failure on the first path is likely to occur in the immediate future; c) after deciding a failure is likely to occur in the immediate future but before occurrence of a failure, instigating a switch to a protection path through the network. The quality measure may for example be a raw bit error rate (BER).

The invention may be applied in the context of various networks, for example an optical network, such as a WDM optical network in which case the first path is a wavelength channel through an optical network.

The decision of whether a failure is likely can be made using any suitable technique. For example, it can be as simple as determining if the quality measure has passed some threshold. It might require the quality measure to exceed two thresholds in some short time period. It might be based on the rate of change between consecutive measurements.

Depending upon the rate at which the protection switch can be completed, in some embodiments the complete switch can be done prior to failure of the first path.

In some embodiments, instigating a switch to a protection path through the network is done for higher priority traffic before being done for lower priority traffic.

In some embodiments, the method further involves making connection routing decisions for new connection requests taking into consideration raw bit error rates collected for the network in a manner which encourages the use of links/paths with good raw BER over links/paths with poor raw BER.

Another broad aspect of the invention provides a method of performing protection switching in an optical communications network. The method involves a) on an ongoing basis, monitoring a raw quality measure in respect of a first light path between components in an optical communications network; b) on an ongoing basis, deciding on the basis of the raw quality measure whether a failure on the first light path is likely to occur in the immediate future; c) after deciding a failure is likely to occur in the immediate future but before occurrence of a failure, instigating a switch from a first path using said first light path to a second path not using said first light path, optionally switching at least one service from the first link to the protection link in a sequence based on priority of the services.

Another broad aspect of the invention provides a network node having an input for receiving on an ongoing basis raw BER measurements in respect of a path through a network of which the network node forms a part, and having decision means adapted to, on an ongoing basis, decide on the basis of the raw BER measurements whether a failure on the path is likely to occur in the immediate future, and after deciding a failure is likely to occur in the immediate future but before occurrence of the failure to instigate a switch to a protection path through the network.

In some embodiments, the network node is adapted for use in an optical network, wherein the first path is a wavelength channel through an optical network.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

A failure in a telecommunications network generally happens over a very short time period. Although this time is short, it is not instantaneous. For example, consider a backhoe cutting a fiber optics cable. As the backhoe comes into contact with the sheathing around the cable, the fiber inside it is bent, in an increasingly sharp manner, until it is broken. Even if the backhoe is moving quickly, this process will take a number of milliseconds.

As the fiber is bent, the light signal degrades, resulting in an increasing number of bit errors. This bit error rate (BER) can be monitored by network equipment to which the fiber is connected.

Figure 1:
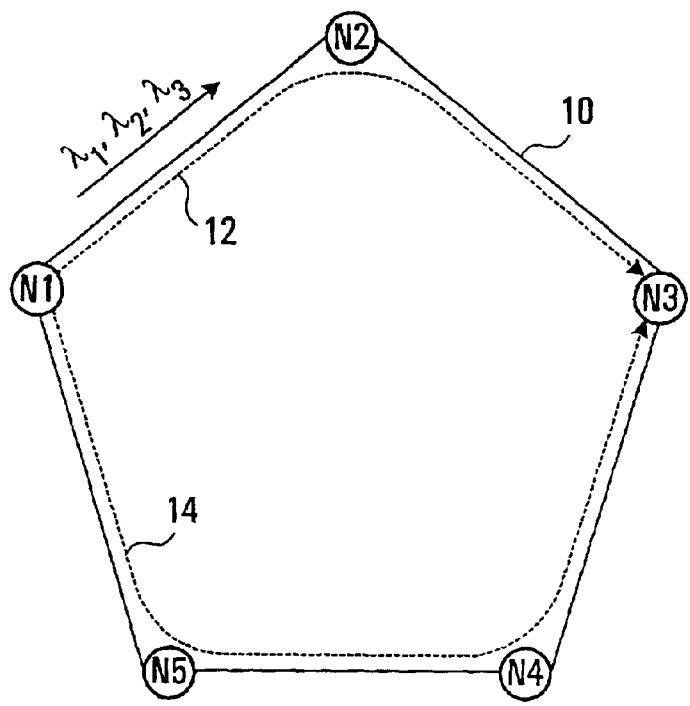
FIG. 1 is a schematic diagram of an example network within which the protection switching methods provided by the invention may be employed.

An example network is shown in FIG. 1. Shown is a WDM system having five optical networking nodes N1, N2, N3, N4 and N5 interconnected by optical fiber in a ring configuration generally indicated by 10. In a WDM (wavelength division multiplexing) system, signals are sent over the fiber ring 10 using multiple wavelengths. In FIG. 1 three wavelengths $\lambda_1$, $\lambda_2$ and $\lambda_3$ are shown. A "service" between N1 and N3 delivers data between those two nodes. This might employ, for example, a primary path between N1 and N3 generally indicated by 12 which might for example employ $\lambda_1$. A protection path 14 is also shown which might use the same or some other wavelength. The protection path 14 may be a dedicated protection path, or a shared protection path to be made available for multiple users for example. A "path" for this optical networking example is an end-to-end connection. This might involve one or more light paths. A light path is part or all of a path, with electrical optical (EO) conversion taking place at one end of the light path and optical electrical (OE) conversion taking place at the other end of the light path. Light paths may also be referred to as "hops". Finally, an optical connection between adjacent optical components at least one of which does not perform an OE or EO conversion will be referred to as a light section.

In the example of FIG. 1, path 12 has a single light path, since the signal is not dropped at node N2.

A Protection may be available at the path level or at the light path level.

The networking nodes N1, N2, N3, N4 and N5 may perform add/drop multiplexing. For example, for a primary path between N1 and N3 on a particular wavelength $\lambda_1$, the primary path goes through N2 unaffected and is dropped at N3.

Data is transmitted through the system in a packetized format with a redundancy scheme such that some error correction can be performed at the receiver. For example a digital wrapper may be used that supports FEC (forward error correction). Through the use of such FEC, bit errors can be detected and corrected, up to a certain BER threshold with the result that throughput of the actual data is largely unaffected for a transmission BER up to that BER threshold. Above the BER threshold, the errors can no longer be corrected, and the service provided by the signal is affected. In conventional systems which employ this corrected BER to perform restoration switching, there is a delay in the time taken to respond to a fault until the fault is detectable at a higher layer, such as layer 2 for example.

Typically, corrected BER is determined at points where optical-electrical conversion are performed, i.e. for each light path.

Restoration provides the ability to reroute a service around a network failure. Previously, this was done once the service had completely failed as determined by examining the corrected BER. According to the invention, the restoration process is started before the errors become uncorrectable, and preferably a complete switch to the protection path through the network is made without affecting the service's data stream. In some embodiments where it is appropriate to think of layered protocol stacks, these methods leverage forward error correction and uncorrected BER to effect traffic redirection before faults are observed at layer 2 and above. This is as opposed to the method of switching layer 2 traffic in response to bitstream characteristics observed at that layer.

Figure 2:
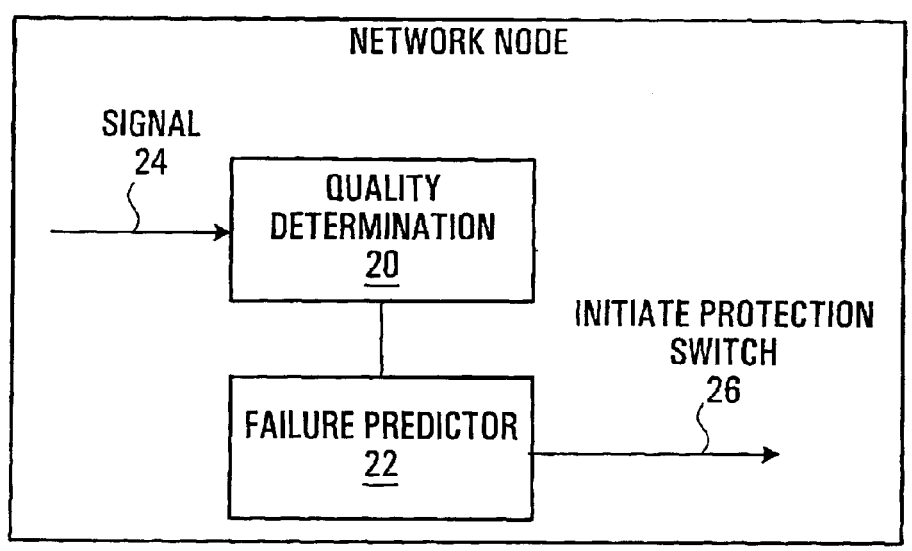
FIG. 2 is a block diagram of a network node of FIG. 1 according to an embodiment of the invention.

Referring now to FIG. 2, shown is a network node adapted to initiate restoration in this manner. Any number of the nodes N1, N2, N3, N4 and N5 of FIG. 1 might be implemented in this manner. The network node has a quality determination block 20 which estimates, measures or otherwise determines a raw quality measure somehow associated with received signal 24. In a preferred embodiment and the remainder of this description, this quality measure is assumed to be a BER (bit error rate), but this need not necessarily be the case. It is important that whatever the raw quality measure is, it can be determined in real time from the received signal. Typically the raw quality measure is determined for each wavelength since a given service will typically use a channel consisting of a single wavelength.

The raw quality measure may be an end-to-end quality measure for an entire path. Alternatively, the raw quality measure for a given path will be the raw quality measures of each light path making up the path.

In some embodiments, the raw quality measure, preferably the raw BER is advertised as a state metric for each path and/or light path by one or more network nodes having knowledge of this state. This state metric information would be received the network node of FIG. 2 and coordinated with a given service for which protection switching decisions are then made. Then, whatever nodes are responsible for making protection switching decisions can make their decisions on the basis of this advertised information.

Also shown is a failure predictor block 22 which processes the raw quality measures from the quality determination block 20. The failure predictor block 22 makes a decision as to whether recent quality measures are indicative of a pending failure of the particular channel. The failure predictor block 22 makes this decision prior to the actual failure of the channel, during the period in which bit errors are still correctable by the error correction scheme. In the event the decision is made that a failure is likely, an "initiate protection switch" signal 26 is generated by the failure predictor block 22. For the purposes of this invention, this signal is symbolic of the decision that a failure is likely to occur in the immediate future. Such a signal may not necessarily be generated if protection switching can be effected locally.

Figure 3:
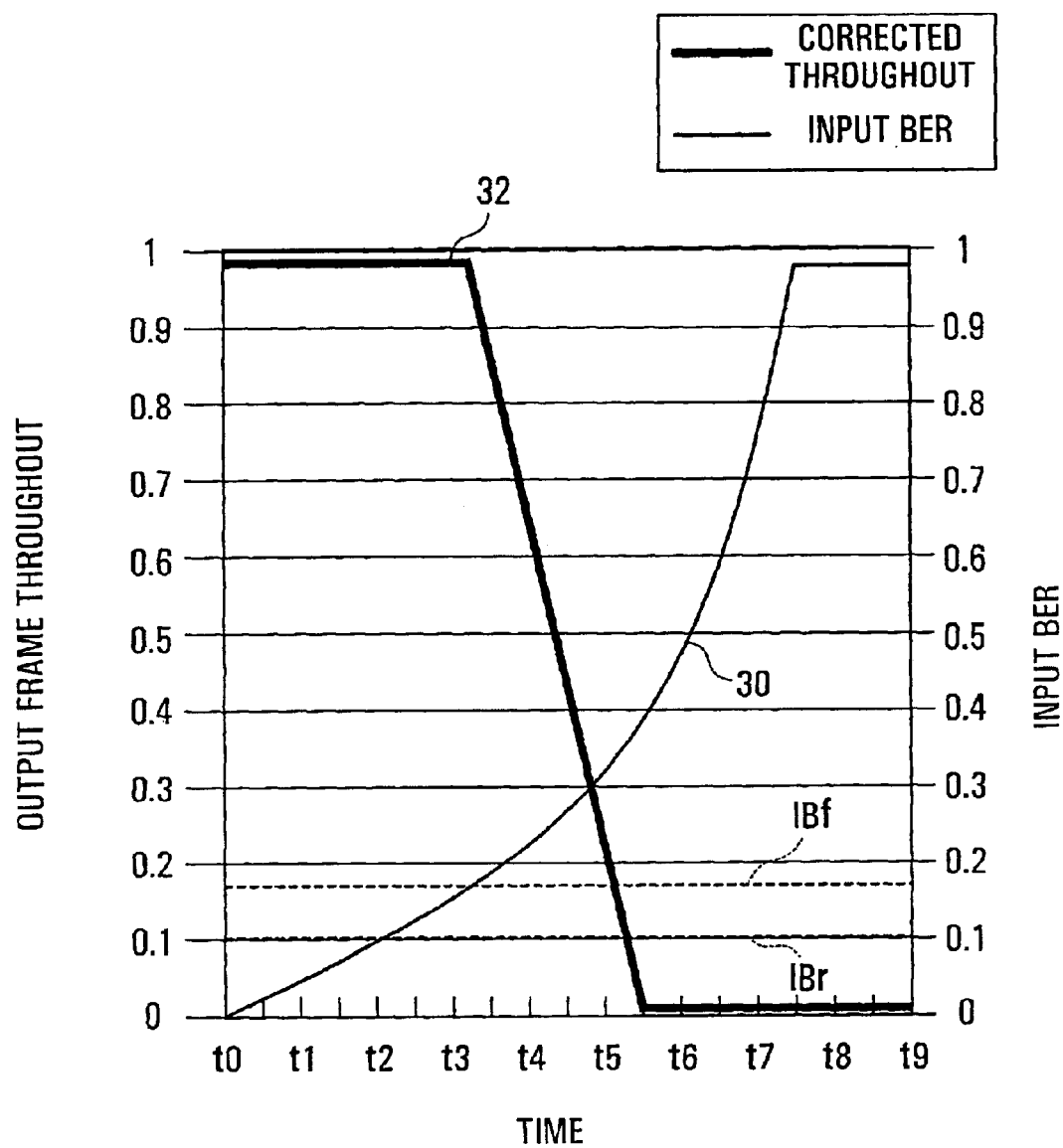
FIGS. 3 and 4 are plots of corrected throughput and input BER for an example failure scenario.

FIG. 3 shows an illustrative failure scenario timeline with an input BER 30, and output corrected throughput 32 (the scale values on the axes are for illustrative purposes only). The network failure starts to occur at time t0 at which time the input BER 30 starts to increase. Initially, the FEC is capable of correcting these errors, and so the corrected throughput 32 remains unaffected. However, when the BER does reach a threshold, IBf, approximately 0.18 in this example, the FEC can no longer correct the errors, and so the corrected throughput 32 drops. Typically, once the BER exceeds the threshold, the corrected throughput 32 will drop very quickly with increasing BER.

According to one embodiment of the invention in order to minimize data loss, restoration is started before the BER reaches IBf, for example when the BER reaches a smaller threshold IBr.

Figure 4:
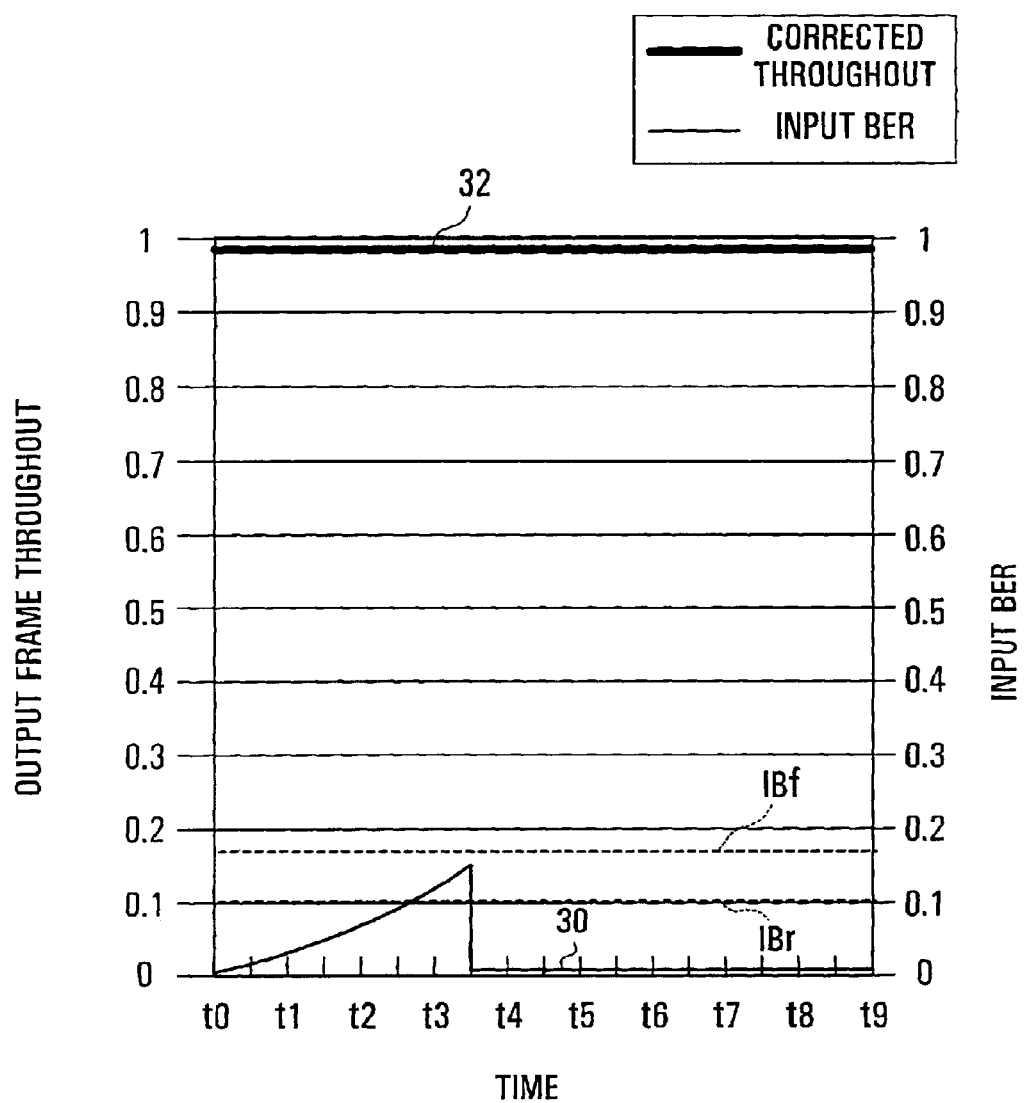

In one embodiment, the following protection scheme is employed, this being shown by way of example in FIG. 4 where tn corresponds to a time value on the horizontal axis:

t0: network is functioning without problem.

t1: network failure starts, input BER starts to increase. FEC corrects errors.

t3: input BER reaches IBr and/or failure predictor decides failure likely to occur. Restoration starts. FEC continues to correct errors.

between t3 and t4: service starts using the protection path with minimal and preferably no data loss. BER returns to nominal small value. The BER never reaches IBf.

The mechanics of how the protection switchover is implemented are not essential to the invention. Preferably, the switchover is done quick enough that data is flowing on the new path before the failure occurs. However, if the primary path fails before the protection switching can be completed there will be some data loss.

Preferably, some intelligence is employed in the failure predictor 22 rather than simply using a hard threshold IBr, so as to distinguish between a scenario in which the BER is temporarily increased, but a failure is not about to occur. For example, the failure predictor could require that in addition to the latest BER exceeding the threshold IBr, a rate of increase (for example between two consecutive measurements) must also exceed some value indicating that a failure is likely with the assumption that a slow increase is less likely to be indicative of an immanent failure. A first or higher order derivative approximation might alternatively be employed.

In another example, two predictive thresholds (both below the failure threshold) may be used, and if the two thresholds are crossed in a short enough period of time, then the decision to instigate protection switching is made.

In another embodiment of this invention, during the restoration period, the new path is created, data is sent on both paths, and the receiver switches to data arriving on the new path before the first path stops sending data. This ensures there is no gap in the data. In this case the timeline would be as follows:

T0: network is functioning without problem

T1: network failure starts, input BER starts to increase. FEC corrects errors.

T2: input BER reaches IBr and/or failure predictor decides failure likely to occur. Restoration starts. FEC continues to correct errors.

T3: Service still using first path. FEC continues to correct errors on the first path. The new path is up and is passing data.

T4: service starts using the new path. FEC continues to correct errors on the first path.

T5: input BER on first path reaches Ibf, and first path is dropped.

The above embodiment of the invention has focussed on the protection switching of paths by predicting failure based on BER. This involves layer 2 (path maintenance) in the protocol stack making use of layer 1 data (BER) which is somewhat of a break from convention. Preferably, the BER information is forwarded to the source for each path, and the source makes the decision as to whether or not to re-route.

In another embodiment of the invention, the approach is used to perform layer 1 protection switching. For this embodiment, a specific light path (within a path) may have a primary light path and a protection light path. The scheme is then used to switch from the primary light path to the protection light path. This involves determining a BER on a per light path basis.

Figure 5:
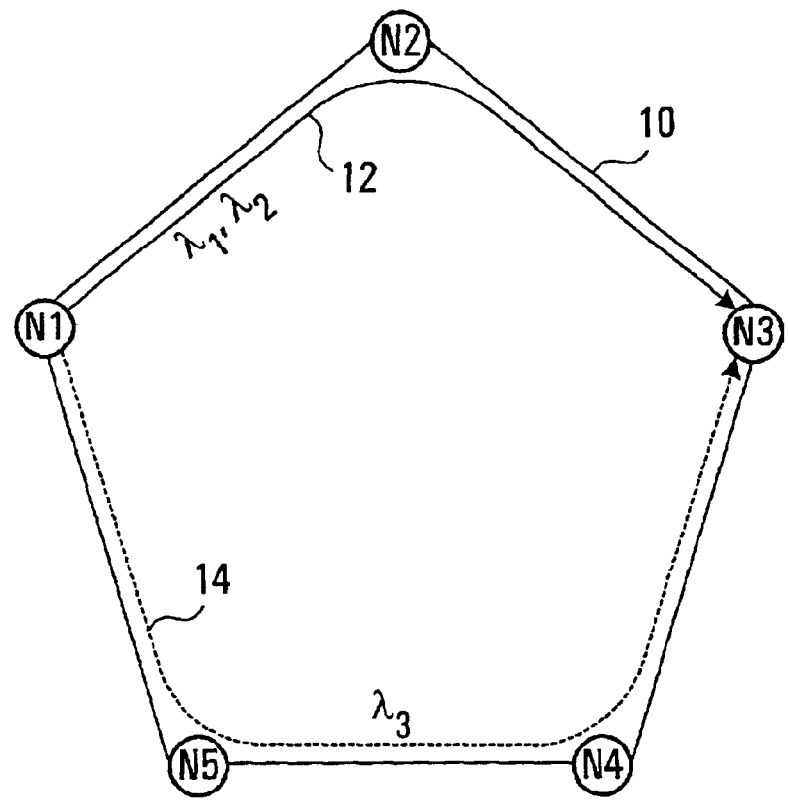
FIG. 5 is an example of a network in which prioritized re-routing has been performed.

In another embodiment, for either layer 1 protection switching or layer 2 protection switching, preferably high priority traffic is switched to the protection path/light path prior to low priority traffic. Advantageously, high priority traffic is more likely to get completely switched before a failure occurs when this technique is employed. An example of this is shown in FIG. 5 where it is assumed that $\lambda_1$ and $\lambda_2$ are lower priority than $\lambda_3$, and that switchover has started with the result that $\lambda_3$ has been switched over to the protection path 14 prior to the two lower priority wavelengths.

In another embodiment of the invention, the raw BER determinations are used in making traffic engineering decisions, typically a layer 3 function. In this embodiment, raw BER information is maintained on an ongoing basis for available paths and/or links through a network. Then, in addition to any other constraints which might be employed in making routing decisions, the BER information is also considered. In such a manner, paths/light paths with good raw BER information are favored over paths/light paths with poor raw BER information. This might be implemented by including the BER in the administrative cost for example.

Figure 6:
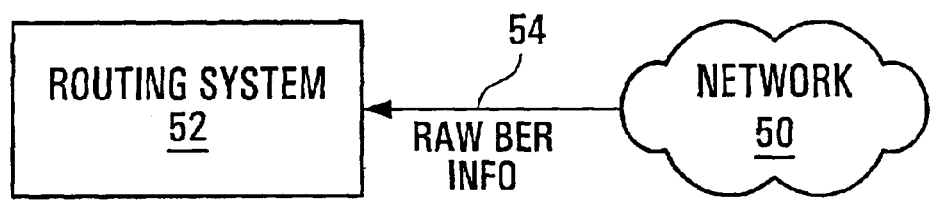
FIG. 6 is a block diagram of a system in which raw BER information is used to make routing decisions at connection setup.

An example of this is shown in FIG. 6. Shown is a network generally indicated by 50, and a routing system generally indicated by 52, typically implemented as part of network 50. The routing system decides how to route new requests for connections from source to destination in the network 50. On an ongoing basis, the network 50 provides raw BER information 54 to the routing system 52. This might be done on a path or a light path basis. The routing system 52 then considers the BER information thus collected in the determination of new routes. The determination of the routes may involve the determination of a primary and a protection path for the connection. The routing system 52 may employ well known multi-constraint algorithms to which the additional parameter of raw BER are added.

In a modification to the above-described embodiments of the invention, the failure predictor block 22 can process the quality measures from the quality determination block 20 by using a predictive mechanism based on defining derivatives of BERs. The block 20 measures an initial $BER_0$ value when the system is set up, and stores the value in a memory of the block 22. The control circuit of the block 20 continues to measure BER at periodic time intervals (i.e. . . . $t_{n-2}$, $t_{n-1}$, $t_n$ . . . ), stores the corresponding values of BERs ($BER_{n-2}$, $BER_{n-1}$, $BER_n$, . . . ) in the memory, and sends the stored value to the failure predictor block 22. At each time interval ($t_n$) the control circuit of the predictive block 22 calculates a deviation of the current BER from the initial $BER_0$:

$$\Delta_{n-1} = BER_{n-1} - BER_0 \quad (1)$$

$$\Delta_n = BER_n - BER_0 \quad (2)$$

The control circuit also calculates a speed of BER change by taking a derivative from the BER deviations and predicts a $BER_{n+1}$ the next time interval ($t_{n+1}$)

$$D_n = \frac{\Delta_n - \Delta_{n-1}}{t_n - t_{n-1}} \quad (3)$$

$$BER_{n+1} = BER_n + D_n \cdot (t_n - t_{n-1}) \quad (4)$$

The predicted $BER_{n+1}$ is compared with a predetermined threshold value. If the amplitude of the predicted $BER_{n+1}$ is greater than the predetermined threshold value, the control circuitry of the predictor block 22 generates a signal to switch to a protection path through the network. In other variations, at least one second or higher order derivative may be used.

Numerous modifications and variations of the present invention are possible in light of the above teachings. It is therefore to be understood that within the scope of the appended claims, the invention may be practiced otherwise than as specifically described herein.

For example, while the invention has been described in the context of a WDM system, more generally it may be employed in networks subject to failure.

For example, in another embodiment, the raw quality measure for a path or a light path is determined as a function of one or more raw quality measures for light sections making up the path or light path. This involves making a raw quality measure in the optical domain.

We claim:

1. A method of performing protection switching in a communications network, the method comprising:
    a) on an ongoing basis, providing forward error correction (FECI coding for data transmitted on the communications network and monitoring a raw bit error rate (BER) determined prior to performing the error correction based on the FEC coding in respect of a first path through the communications network;
    b) on an ongoing basis, determining a first order derivative of said raw BER based on at least one previous raw BER and a current raw BER;
    c) determining a predicted raw BER at a next time interval based on the current BER and said first order derivative; and
    d) comparing the predicted BER with a predetermined threshold, and if the predicted raw BER is exceeding the threshold, instigating a switch to a protection path through the network.

2. A method as described in claim 1, wherein the step (b) further comprises determining a second order derivative of the raw BER based on the previously measured raw BERS and the current raw BER, and the step (c) comprises determining the predicted raw BER at the next time interval based on the current BER and said first and second order derivatives.

3. A method as described in claim 2, wherein the step (b) further comprises determining at least one third or higher order derivative of the raw BER based on the previously measured raw BERS and the current raw BER, and the step (c) comprises determining the predicted raw BER at the next time interval based on the current BER and said derivatives.

4. A method according to claim 1 wherein the first path is a path for a wavelength channel through an optical network.

5. A method according to claim 1 wherein the step (c) comprises determining if the predicted BER crosses two thresholds within a time shorter than a predetermined time.

6. A method according to claim 1 wherein the protection path is a path available for a wavelength channel.

7. A method according to claim 1 wherein the protection path is a dedicated path for the first path.

8. A method according to claim 1 wherein: instigating a switch to a protection path through the network is done for higher priority traffic before being done for lower priority traffic.

9. A method according to claim 1 wherein the raw BER measure in respect of the first path through the communications network comprises a BER measurement for each of the light paths making up the first path.

10. A method according to claim 1 further comprising making connection routing decisions for new connection requests taking into consideration raw bit error rates collected for the network in a manner which encourages the use of links/paths with good raw BER over links/paths with poor raw BER.

11. A method of performing protection switching in an optical communications network, the method comprising:
    a) on an ongoing basis, providing forward error correction (FEC) coding for data transmitted on the communications network and monitoring a raw bit error rate (BER) determined prior to performing the error correction based on the FEC coding in respect of a first light path between components in an optical communications network;
    b) on an ongoing basis, determining a first order derivative of said raw BER based on at least one previously measured raw BER and a current raw BER;
    c) determining a predicted raw BER at a next time interval based on the current BER and said first order derivative; and
    d) comparing the predicted BER with a predetermined threshold, and if the predicted raw BER is exceeding the threshold, instigating a switch to a protection link through the network, and switching at least one service from the first light path to the protection light path.

12. A method as described in claim 11, wherein the step (b) further comprises determining a second order derivative of the raw BER based on the previously measured raw BERS and the current raw BER, and the step (c) comprises determining the predicted raw BER at the next time interval based on the current BER and said first and second order derivatives.

13. A method as described in claim 12, wherein the step (b) further comprises determining at least one third or higher order derivative of the raw BER based on the previously measured raw BERS and the current raw BER, and the step (c) comprises determining the predicted raw BER at the next time interval based on the current BER and said derivatives.

14. A method according to claim 11 wherein instigating a switch to the protection light path is done in a sequence based on priority of the services.

15. A method according to claim 11 further comprising making connection routing decisions for new connection requests taking into consideration raw bit error rates collected for the network in a manner which encourages the use of paths/light paths with good raw BER over paths/light paths with poor raw BER.

16. A network node comprising: an input for receiving on an ongoing basis raw BER measurements in respect of a path through a network of which the network node forms a part; and a decision means adapted to, on an ongoing basis, to determine a first order derivative of said raw BER based on at least one previous raw BER and a current raw BER, to determine a predicted raw BER at a next time interval based on the current BER and said first order derivative, and to instigate a switch to a protection path through the network if the predicted raw BER is exceeding a threshold.

17. A network node according to claim 16 adapted for use in an optical network, wherein the first path is a path for a wavelength channel through an optical network.

18. A network node according to claim 16 adapted to transmit traffic of differing priorities on said path, and adapted to instigate a switch to a protection path through the network for higher priority traffic before doing so for lower priority traffic.

19. A network node according to claim 16 wherein the raw BER measurements comprise a BER measurement for each link making up the first path.

20. A network node according to claim 16 further comprising:

a network routing component adapted to make connection routing decisions in respect of new connection requests, the network routing component being adapted to take into consideration the raw bit error rates collected for the network in a manner which paths/light paths with poor raw BER.

* * * * *

UNITED STATES PATENT AND TRADEMARK OFFICE
CERTIFICATE OF CORRECTION

PATENT NO. : 6,915,463 B2 Page 1 of 1
APPLICATION NO. : 10/025868
DATED : July 5, 2005
INVENTOR(S) : R. Vieregge et al.

It is certified that error appears in the above-identified patent and that said Letters Patent is hereby corrected as shown below:

Column 7, line 52, "(FECI" is corrected to read as --(FEC)--

Column 8, line 3, "BERS" is corrected to read as --BERs--

Column 8, line 11, "BERS" is corrected to read as --BERs--

Column 8, line 60, "BERS" is corrected to read as --BERs--

Column 8, line 67, "BERS" is corrected to read as --BERs--

Signed and Sealed this

Seventh Day of July, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,915,463 B2 | Page 1 of 1 |
| APPLICATION NO. | : 10/025868 | |
| DATED | : July 5, 2005 | |
| INVENTOR(S) | : R. Vieregge et al. | |

It is certified that error appears in the above-identified patent and that said Letters Patent is hereby corrected as shown below:

On the Title Page, insert the following:

Item --(73) Assignee: Tropic Networks Inc., Canada (CA)--

Signed and Sealed this
Twenty-eighth Day of June, 2011

David J. Kappos
*Director of the United States Patent and Trademark Office*